D. McLean,
Fish Hook,
No. 17,803.   Patented July 14, 1857.

UNITED STATES PATENT OFFICE.

DONALD McLEAN, OF BOSTON, MASSACHUSETTS.

SELF-SETTING TRAP-HOOK.

Specification forming part of Letters Patent No. 17,803, dated July 14, 1857.

*To all whom it may concern:*

Be it known that I, DONALD McLEAN, of Boston, in the county of Suffolk and Commonwealth of Massachusetts, have invented a new and useful Self-Setting Trap-Hook; and I do hereby declare that the following is a full, clear, and exact description of the construction and operation of the same, reference being had to the accompanying drawings, forming a part of this specification, in which—

Figure 1:
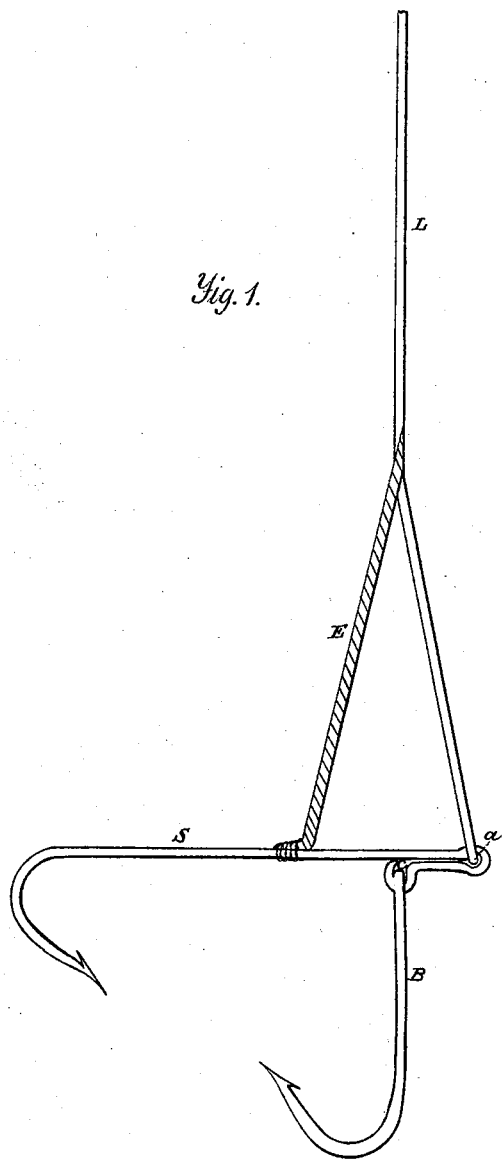
Figure 2:
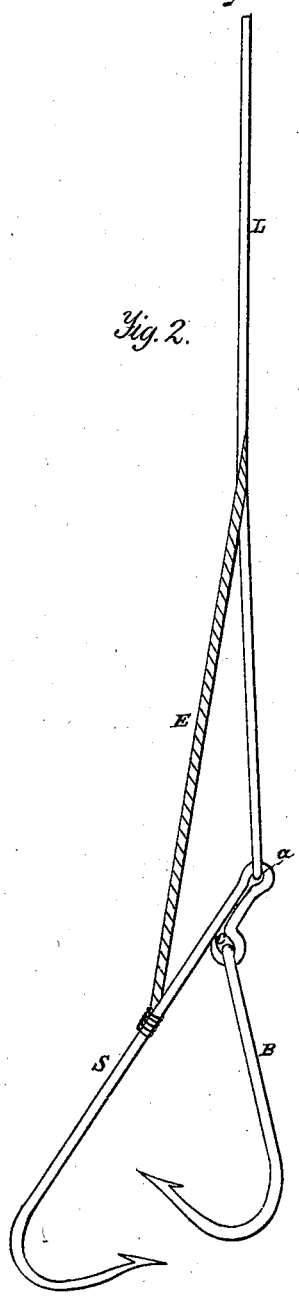

Figure 1 represents the hook as it naturally hangs suspended from the line, and Fig. 2 the same with the spear-hook drawn down by the weight or pulling of the fish on the bait-hook.

The nature of my invention consists in so uniting and suspending two hooks that whenever a fish pulls upon the bait-hook the other will be instantly drawn down and enter the fish, thereby rendering its capture more certain, and preventing the loss of many which would otherwise escape; also, in so supporting the spear-hook by an elastic cord or spiral spring that the hook shall be a self-setting trap-hook, so that in case of a nibble or partial springing down of the spear-hook it will spring back and set itself without the fisherman being obliged to haul up and reset, as it is necessary to do with the trap-hooks in common use.

To enable others skilled in the art to make and use my invention, I will proceed to describe its construction and operation.

Similar parts in both figures are indicated by the same letters.

S is the spear-hook, one end of which is furnished with a barbed point, like that of a common hook, while the other is bent, as seen in the figures, so as to form two loops, a and c.

B is the bait-hook, constructed every way like a common hook, with the exception of the upper end, which is bent, as seen in the figures, so as to hook into the loop c and swing with freedom in it.

L is the line, made fast in the loop a of the spear-hook S.

E is an elastic spring of rubber, or a small metallic spiral spring, one end of which is attached to the hook S, and the other to the line L, as represented in the figures. This spring should be as weak as possible and be sufficiently strong to hold the hook S in a horizontal position, as represented in Fig. 1.

The hook B is baited like any common hook, and with the same facility, and used in a similar manner. Hook S may also be baited.

The moment a fish pulls on the bait-hook B, it is obvious that the elastic cord or spring E will stretch, as seen in Fig. 2, and the point of the hook S will be driven either into the gills or some other part of the fish, rendering it almost impossible for a fish once hooked ever to break away and be lost before it is secured, as is often the case with common single hooks, being the cause of great vexation as well as pecuniary loss to the fisherman; or, again, when there is a shoal of fishes round the hooks, it will often happen that a fish biting at hook B will cause hook S to be driven into another fish, and thus two captures will be made at once. Both hooks can also always be baited, and thus answer the purpose of a double hook.

It is plain that my self-setting trap-hook may be made of any size, great or small, and also that it is so simple in its structure as to have but little liability of getting out of repair, and may be afforded for about the price of two single common hooks, being in these respects, I think, greatly superior to any other hook extant for accomplishing the object desired.

What I claim as my invention, and desire to secure by Letters Patent, is—

The above combination of the hooks B and S, constructed substantially as set forth, with the elastic cord or spiral spring E, and line L, operating as described, and for the objects specified.

DONALD McLEAN.

Witnesses:
C. WHITAKER,
C. D. DAHUHN.